(12) United States Patent
Parigian

(10) Patent No.: US 6,598,893 B2
(45) Date of Patent: Jul. 29, 2003

(54) MULTI-LINKING, ROCKERED REAR SUSPENSION SYSTEM FOR TWO-WHEELED VEHICLES

(76) Inventor: Greg M. Parigian, 10446 Variel Ave., Chatsworth, CA (US) 91311

( * ) Notice: Subject to any disclaimer, the term of this patent is extended or adjusted under 35 U.S.C. 154(b) by 0 days.

(21) Appl. No.: 10/075,478

(22) Filed: Feb. 13, 2002

(65) Prior Publication Data

US 2002/0130486 A1 Sep. 19, 2002

Related U.S. Application Data

(63) Continuation-in-part of application No. 09/749,118, filed on Dec. 27, 2000.

(51) Int. Cl.$^7$ ............................................... B62K 25/12
(52) U.S. Cl. ....................................... 280/284; 180/227
(58) Field of Search ................................ 280/283, 284, 280/285, 286; 180/227, 219

(56) References Cited

U.S. PATENT DOCUMENTS

| | | | |
|---|---|---|---|
| 1,148,707 A | * | 8/1915 | Morley |
| 4,058,181 A | * | 11/1977 | Buell ............................ 180/32 |
| 5,469,930 A | * | 11/1995 | Wiers ........................... 180/227 |
| 5,487,443 A | * | 1/1996 | Thurm .......................... 180/227 |
| 6,003,628 A | * | 12/1999 | Jurrens et al. .................. 180/227 |
| 6,102,421 A | * | 8/2000 | Lawwill et al. ................. 280/284 |
| 6,131,684 A | * | 10/2000 | Ticknovich ..................... 180/227 |
| 6,131,934 A | * | 10/2000 | Sinclair ........................ 280/284 |
| 2002/0011715 A1 | * | 1/2002 | Parigian ........................ 280/284 |

* cited by examiner

Primary Examiner—Avraham Lerner
(74) Attorney, Agent, or Firm—Kelly Bauersfeld Lowry & Kelley, LLP

(57) ABSTRACT

A rear suspension system for two-wheeled vehicles having a generally triangular configuration includes first and second spaced apart support axle plates having aligned apertures that receive an axle of a rear wheel of the vehicle. An upper arm assembly is pivotally connected between a vehicle frame and the first and second support plates. A lower arm assembly is pivotally connected at a first end to the first and second support axle plates. First and second control arms are pivotally connected to a pivot arm assembly, a second end of the lower arm assembly, and to the upper arm assembly. A shock unit is associated with a lower arm assembly or pivot arm assembly at one end, and to the vehicle frame at the opposite end.

13 Claims, 4 Drawing Sheets

US 6,598,893 B2

MULTI-LINKING, ROCKERED REAR SUSPENSION SYSTEM FOR TWO-WHEELED VEHICLES

RELATED APPLICATION

This application is a continuation-in-part of U.S. application Ser. No. 09/749,118, filed Dec. 27, 2000.

BACKGROUND OF THE INVENTION

The present invention relates generally to two-wheeled vehicles. More particularly, the present invention relates to a rear suspension system for two-wheeled vehicles, such as motorcycles, employing pivoting arm assemblies and control arm possessing shock absorption characteristics and providing lateral stability.

The existing designs of most prior art rear suspension assemblies for two-wheeled vehicles include a rear pivot from a single point either from a dual or mono shock system that either extends or comprises the shock unit. In this respect, when the shock system is affected by power or braking to the rear wheel, system efficiency and stability are compromised. Other systems use a quad-type configuration that only connects to a small section of the frame, providing less structural integrity.

Although recent motorcycle frames include a swing arm configuration, these configurations posses certain deficiencies that detract from their overall utility. The swing arm movement is typically in a pivoting motion upwardly and directed towards the front part of the motorcycle. This causes lateral instability for the rear wheel of the motorcycle. Many existing suspension systems provide inadequate control of the wheel to pavement contact. This can create safety concerns regarding the control of the increased stopping during braking. Aside from the rear wheel wobbling, as described above, many current designs transfer force back to the front of the vehicle under acceleration.

Accordingly, there is a need for a rear suspension system for a two-wheeled vehicle which improves rear wheel geometry. Such a system should also increase lateral stability of the rear wheel of the vehicle and improve wheel contact with the pavement. Such a system should further contain the power under acceleration and not transfer force back to the front of the vehicle. The present invention fulfills these needs and provides other related advantages.

SUMMARY OF THE INVENTION

The present invention relates to a rear suspension system for two-wheeled vehicles. The system includes first and second spaced apart and parallel support axle plates. The first and second support axle plates include aligned apertures configured to receive an axle of a rear wheel of the two-wheeled vehicle, such as a motorcycle.

An upper arm assembly is pivotally connected at a first end thereof to a vehicle frame, and at a second end thereof to the first and second support axle plates. The upper arm assembly is comprised of a base pivotally connected to the vehicle frame. A first elongated arm extends from the base to a pivotal connection point at the first support axle plate. A second elongated arm extends from the base generally parallel to the first arm to a pivotal connection point at the second support axle plate.

First and second control arms are pivotally connected at the respective first ends to the upper arm assembly, typically intermediate the ends of the first and second arms.

A lower arm assembly is pivotally connected at a first end thereof to the first and second support axle plates, and pivotally connected at a second end thereof to second ends of the first and second control arms. The lower arm assembly includes a base having a first elongated arm extending therefrom to a pivotal connection point at the first support axle plate. A second elongated arm extends from the base generally parallel to the first arm to a pivotal connection point at the second support axle plate.

A pivot arm assembly is pivotally connected at a first end to the vehicle frame, and at a second end to the first and second control arms. The pivot arm assembly comprises a pair of angular brackets spaced apart and generally parallel to one another and having a shaft extending between first ends thereof for pivotal connection to the vehicle frame. A shaft extends through second ends thereof for pivotal connection to the first and second control arms, intermediate the ends thereof.

A compressible shock unit is associated at one end with the lower arm assembly or pivot arm assembly, and connected at the opposite end thereof to the vehicle frame. In a particularly preferred embodiment, the shock unit is pivotally connected to the base of the lower arm assembly at one end, and pivotally connected to the vehicle frame at the other end of the shock unit generally opposite the lower arm assembly. The above-described system has a generally triangular configuration. With the system of the present invention, lateral stability is created for the rear wheel of the two-wheeled vehicle.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
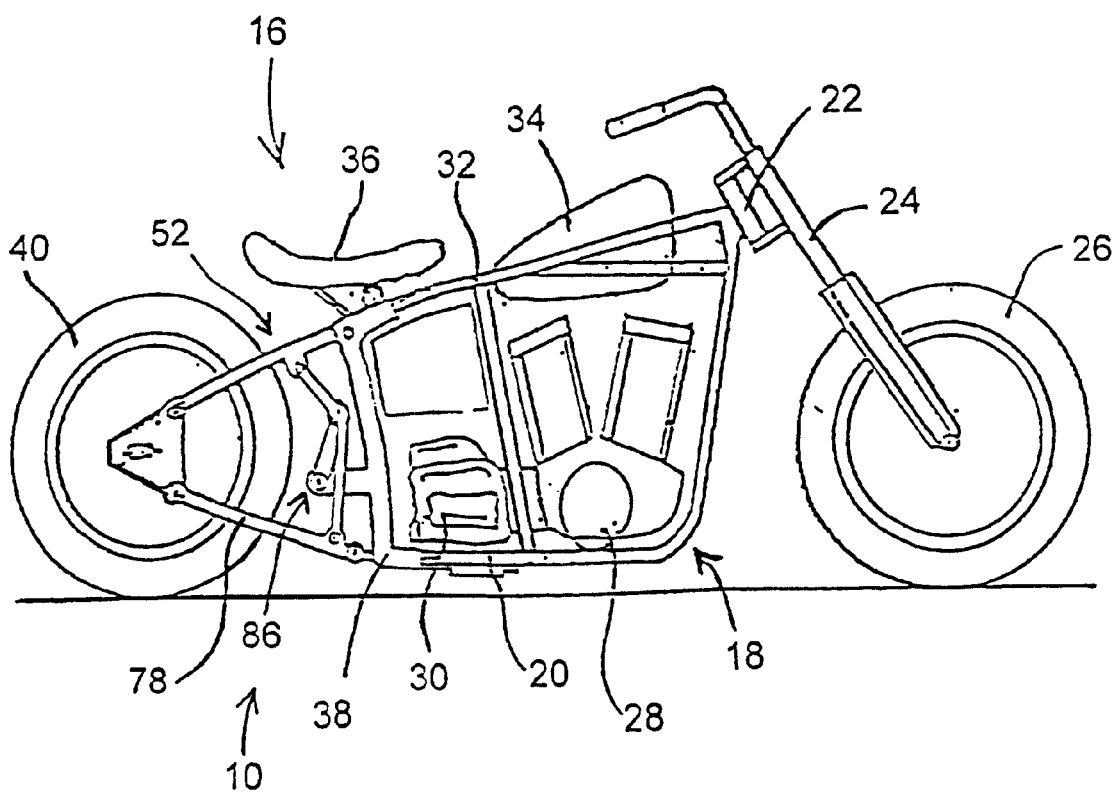
FIG. 1 is a side elevational view of a motorcycle incorporating a rear suspension system embodying the present invention.

As shown in the drawings for purposes of illustration, the present invention is concerned with a rear suspension system for two-wheeled vehicles, generally referred to by the reference number 10 in FIGS. 1–4. The rear suspension system 10 is particularly designed and adapted for use in a motorcycle 16, although it could conceivably be incorporated into any two-wheeled vehicle.

With reference to FIG. 1, a motorcycle 16 is illustrated incorporating the rear suspension system 10 of the present invention. The primary structural component of the motorcycle is the frame 18. The frame 18 is typically comprised of two bottom support tubes 20 which are bent at an upwardly directed angle at a front end thereof to a head tube 22. The head tube 22 is connected to a front wheel torque assembly 24 upon which the front wheel 26 is rotatably mounted. The bottom support tubes 20 also provide an anchor and base for the motor 28, transmission 30, etc. A top support tube 32 extends from the head tube 22 towards the rear of the motorcycle 16, and supports the gas tank 34, seat 36, etc. A rear pair of tube 38 interconnect the top and bottom support tubes 32 and 20, and serve as a rear end of the overall frame 18. Conventionally, the rear suspension is connected to the rear pair of tubes 38 with cross bars or the like. In the present invention, a generally triangular triaxial suspension system 10 extends between the rear tubes 38 and the rear wheel 40 of the motorcycle 16.

Figure 2:
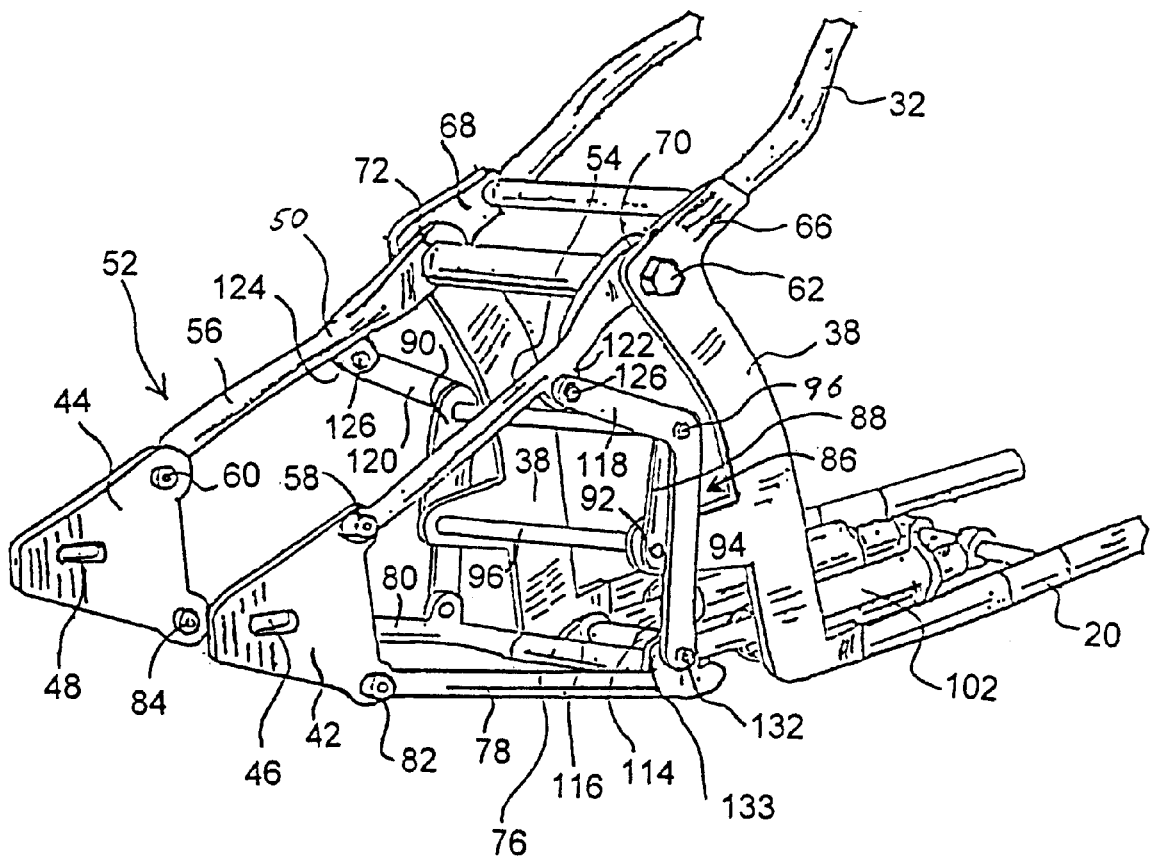
FIG. 2 is a perspective view of the rear suspension system similar to that illustrated in FIG. 1.

With reference to FIG. 2, the rear suspension system 10 of the present invention includes a pair of spaced apart and parallel support axle plates 42 and 44 having aligned apertures 46 and 48 which are configured to receive an axle of the rear wheel 40 of the motorcycle 16, or other two-wheeled vehicle. An upper arm assembly 50 is interconnected between the rear tubes 38 of the frame 18 and the axle plates 42 and 44. The upper arm assembly 50 is generally U-shaped, and includes a base 52 having first and second elongated arms 54 and 56 extending therefrom to pivotal connection points 58 and 60 of the axle plates 42 and 44, respectively. Typically, the arms 54 and 56 are rigidly connected to an upper portion of the upper arm assembly 52 which allows the arms 54 and 56 to pivot and rotate, such as rocker arm fasteners, pins, bushings, etc. The upper arm assembly 50 is pivotally connected to the rear tubes 38 of the frame 18, typically by pins 62 and 64 extending between upper mounting ears 66 and 68 extending from the rear tubes 38 of the frame 18, and mounting ears 70 and 72 extending from the upper arm assembly 50. Of course, other appropriate means of pivotally connecting the upper arm assembly 50 to the rear portion of the frame 38 can also be used.

A lower arm assembly 74 extends adjacent to a lower portion of the rear end 38 of frame 18, and a lower end of each axle plate 42 and 44. The lower arm assembly 74 includes a general U-shaped member having a base 76 and elongated arms 78 and 80 extending from the base 76 to a pivot connection point 82 and 84 on each respective axle plate 42 and 44. Once again a fastener, such as a pin, that allows the lower arm assembly 74 to pivot with respect to the axle plates 42 and 44 is used.

The illustrated suspension system 10 includes two control arms 118 and 120 pivotally connected to the upper arm assembly 54 and 56 to one end and opposite ends connecting to the lower arm assembly 74. A first end of each control arm 118 and 120 is pivotally attached to the upper arm assembly arms 54 and 56 by connecting the ends to a mounting ear 124 with a pin 126 or other appropriate fasteners which allow the control arms 118 and 120 to pivot with respect to the upper arm assembly 50. The opposite ends of the control arm 118 and 120 are pivotally connected to the lower arm assembly arms 78 and 80. This is accomplished using a pin 130 or 132, or other appropriate fastener as described above, connected to bracket 131 and 133 extending from the arms 78 and 80 of the lower arm assembly 74.

The control arms 118 and 120 are positioned generally parallel to one other and provide lateral strength and maintain the pitch or angle of the upper and lower arm assemblies 53 and 74. Thus the control arms 118 and 120 serve to stabilize the entire system 10 so that the rear wheel 40 of the motorcycle, or other two wheeled vehicle, only travels vertically and does not wobble or veer from side to side. Increasing the torsional capabilities of the rear suspension system 10 also substantially improves rear wheel 40 contact with the ground.

The lower arm assembly 74 is pivotally connected to the frame 18 via a pivot arm assembly 86. This assembly 86 is generally H-shaped and includes two brackets 88 and 90 which are angular and spaced apart from one another so as to be generally parallel to one another. A shaft or pin 92 extends between a first end of the brackets 88 and 90 for pivotal connection to mounting ears 94 extending from the rear frame tubes 38. Similarly, a shaft of pin 96 extends through the opposite ends of the brackets 88 and 90 for pivotal connection to control arms 118 and 120, usually intermediate ends thereof. Although the control arms 118 and 120 are illustrated as having an angled configuration, it should be understood by the reader that the invention is not limited to such, the control arms also being capable of being designed to be straight and without angle, the brackets 88 and 90 connecting intermediate the ends of such straight control arms 118 and 120 in a similar fashion.

A shock unit 102, such as a shock absorber typically having a compressible spring, is pivotally interconnected between the lower tubes 20 of the frame 18 and the lower arm assembly 74 or pivot arm assembly 86. Typically, this is done by connecting an upper end of the shock unit 102 with an appropriate fastener 106, such as a rotatable pin or the like, to mounting ears 108 and 110 extending from the lower tubes 20 of the frame 18, or any other rear end portion of the frame 18. The opposite end of the shock unit 102 is pivotally attached intermediate ends of the lower arm assembly brackets 114 and 116. This is done by attaching the appropriate fastener, such as a pin 112 or the like.

Figure 3:
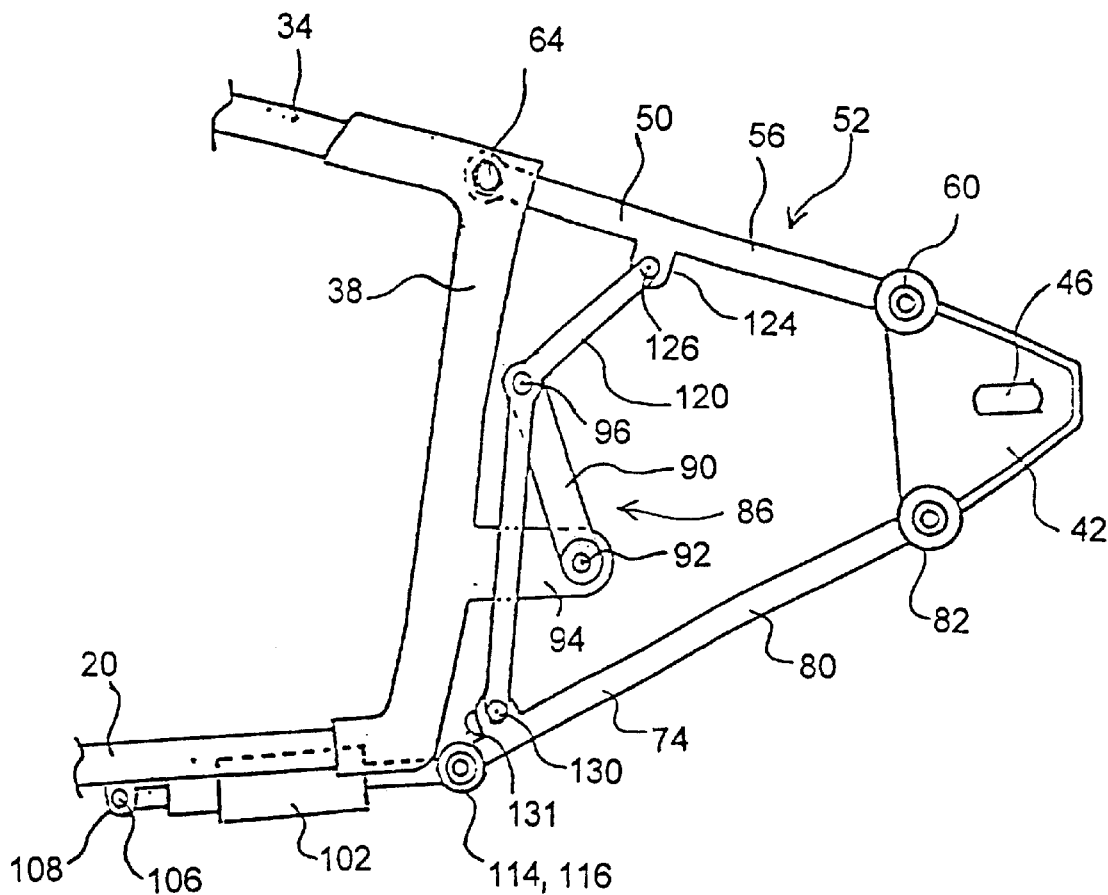
FIG. 3 is a side elevational view of the rear suspension system of FIG. 2 in a relaxed state.
Figure 4:
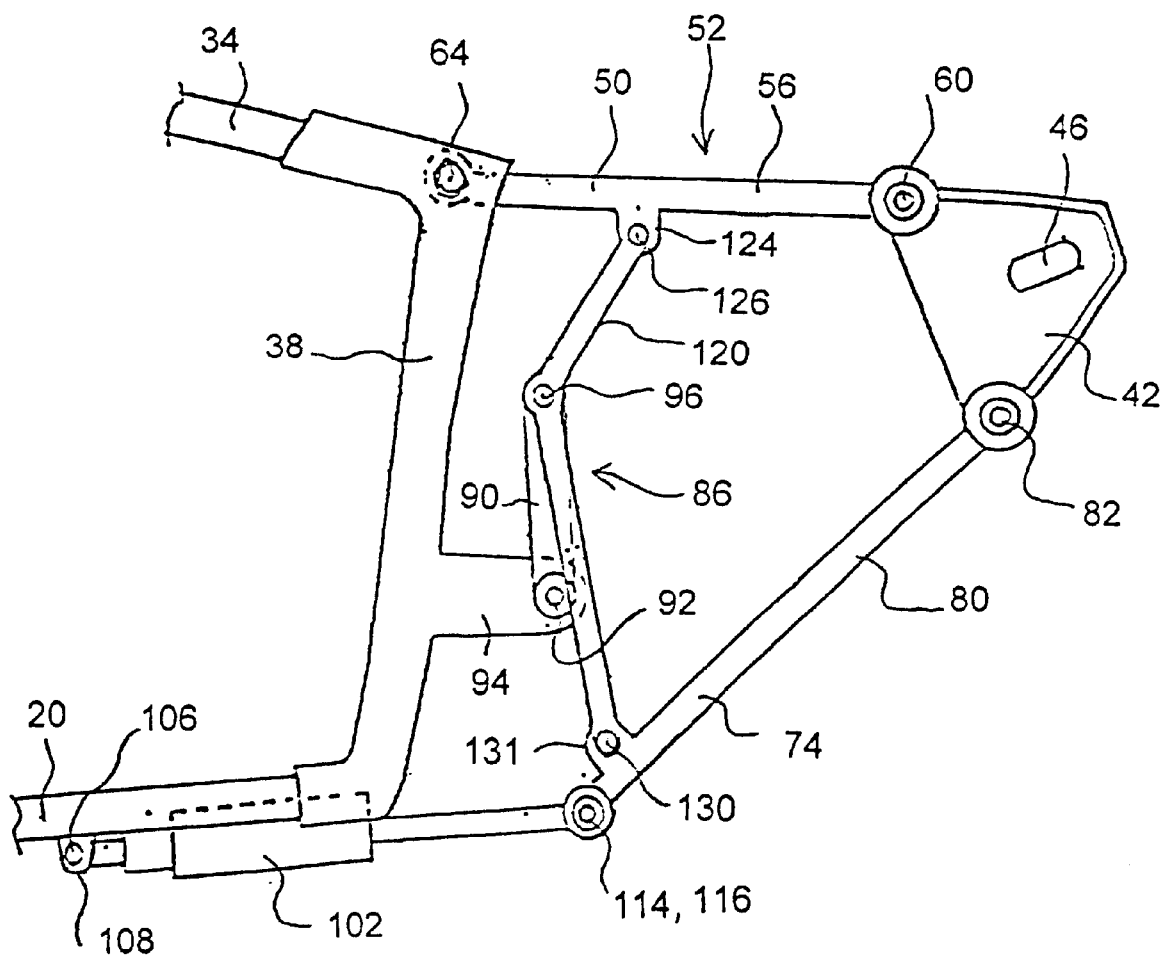
FIG. 4 is a side elevational view of the rear suspension system of FIG. 2 in a compressed state.

With reference to FIGS. 3 and 4, FIG. 3 illustrates the suspension system 10 in a relaxed state. FIG. 4 illustrates the suspension system 10 in a compressed state, such as when the rear wheel 40 encounters a bump. As the motorcycle 16 moves and is subjected to uneven surface bumps or ruts, the system 10 acts in the following manner. The overall movement can best be described as a knee-action movement. As the shock unit 102 is compressed from upper pressure of the wheel 40, the pivot arm assembly 86 is pivoted upwardly about the axis of fasteners 92. This results in the lower arm assembly 74 pivoting in an upward planar motion causing the axle plates 42 and 44 to move upwardly in a planar motion as well. The upper arm assembly 56 also articulates and pivots upwardly in response. The control arms 118 and 120 function to control rotation of the upper and lower arm assemblies 52 and 74, and control the planar motion of the lower swing arms 50 the lower arm assembly 74, respectively. The upwardly directed planar motion results in a minimal amount of frontal directional movement. The amount of travel of motion of the upward arm is controlled by the shock unit 102. As this pressure is reduced, the system 10 reverses this action and conforms to its balanced pre-shock tension position, as illustrated in FIG. 3. The system 10 maintains tension through the weight of the motorcycle 16 pressing down on the shock unit 102.

The downward rebound pivotal motion of the rear suspension system 10 is essentially the reverse of that described above. As the spring shock unit 102 decompresses after rebound, the pivot arm assembly 86 pivots in a downward motion causing the lower arm assembly 74 to move in a downward motion. This in turn causes the axle support plates 42 and 44 to move downward, resulting in the upper arm assembly 50 being pulled downward also. The upwardly and downwardly directed motions are eventually ceased by virtue of the shock absorbing unit 102.

Use of the present invention is advantageous over existing rear suspension systems in that improved rear wheeled contact with the ground is achieved. Also, rear wheel control and stability is also greatly increased, resulting in additional safety.

Although an embodiment has been described in detail for purposes of illustration, various modifications may be made without departing from the scope and spirit of the invention. Accordingly, the invention is not to be limited, except as by the appended claims.

What is claimed is:

1. A rear suspension system for two-wheeled vehicles, comprising:

first and second spaced apart and parallel support axle plates;

an upper arm assembly pivotally connected at a first end to a vehicle frame and at a second end to the first and second support axle plates;

first and second control arms pivotally connected at their respective first ends to the upper arm assembly;

a lower arm assembly pivotally connected at a first end to the first and second support axle plates and pivotally connected at a second end to second ends of the first and second control arms;

a pivot arm assembly pivotally connected at a first end to the vehicle frame and pivotally connected at a second end thereof to the first and second control arms; and a compressible shock unit associated at one end thereof with the lower arm assembly or pivot arm assembly and connected at the opposite end thereof to the vehicle frame.

2. The suspension system of claim 1, wherein the system has a generally triangular configuration.

3. The suspension system of claim 1, wherein the upper arm assembly is comprised of a base pivotally connected to the vehicle frame and a first elongated arm extending from the base to a pivotal connection point at the first support axle plate, and a second elongated arm extending from the base generally parallel to the first arm to a pivotal connection point at the second support axle plate.

4. The suspension system of claim 1, wherein the lower arm assembly includes a base and a first elongated arm extending from the base to a pivotal connection point at the first support axle plate, and a second elongated arm extending from the base generally parallel to the first arm to a pivotal connection point at the second support axle plate.

5. The suspension system of claim 1, wherein the pivot arm assembly comprises a pair of angular brackets spaced apart and generally parallel to one another and having a shaft extending between first ends thereof for pivotal connection to the vehicle frame, and a shaft extending through second ends thereof for pivotal connection to the first and second control arms intermediate the ends of the control arms.

6. The suspension system of claim 4, wherein the shock unit is pivotally connected to the base of the lower arm assembly at one end thereof.

7. The suspension system of claim 6, wherein the shock unit is pivotally connected to the vehicle frame at an end of the shock unit generally opposite the lower arm assembly.

8. The suspension assembly of claim 1, wherein the first and second support axle plates include aligned apertures configured to receive an axle of a rear wheel of the two-wheeled vehicle.

9. A rear suspension system for two-wheeled vehicles, comprising:

first and second spaced apart and parallel support axle plates having aligned apertures configured to receive an axle of a rear wheel of the two-wheeled vehicle;

an upper arm assembly including a base pivotally connected to the vehicle frame, a first elongated arm extending from the base to a pivotal connection point at the first support axle plate, and a second elongated arm extending from the base generally parallel to the first arm to a pivotal connection point at the second support axle plate;

first and second control arms pivotally connected at their respective first ends to the upper arm assembly;

a lower arm assembly including a base connected to second ends of the first and second control arms, a first elongated arm extending from the base to a pivotal connection point at the first support axle plate, and a second elongated arm extending from the base generally parallel to the first arm to a pivotal connection point at the second support axle plate;

a pivot arm assembly pivotally connected at a first end to the vehicle frame and pivotally connected at a second end thereof to the first and second control arms intermediate the ends thereof; and a compressible shock unit associated at one end thereof with the lower arm assembly or pivot arm assembly and connected at the opposite end thereof to the vehicle frame.

10. The suspension system of claim 9, wherein the system has a generally triangular configuration.

11. The suspension system of claim 9, wherein the pivot arm assembly comprises a pair of angular brackets spaced apart and generally parallel to one another and having a shaft extending between first ends thereof for pivotal connection to the vehicle frame, and a shaft extending through second ends thereof for pivotal connection to the first and second control arms.

12. The suspension system of claim 9, wherein the shock unit is pivotally connected to the base of the lower arm assembly at one end thereof.

13. The suspension system of claim 12, wherein the shock unit is pivotally connected to the vehicle frame at an end of the shock unit generally opposite the lower arm assembly.

* * * * *